Sept. 19, 1933.   T. R. HARRISON   1,927,402
MEASURING INSTRUMENT
Filed Jan. 24, 1930   2 Sheets-Sheet 1
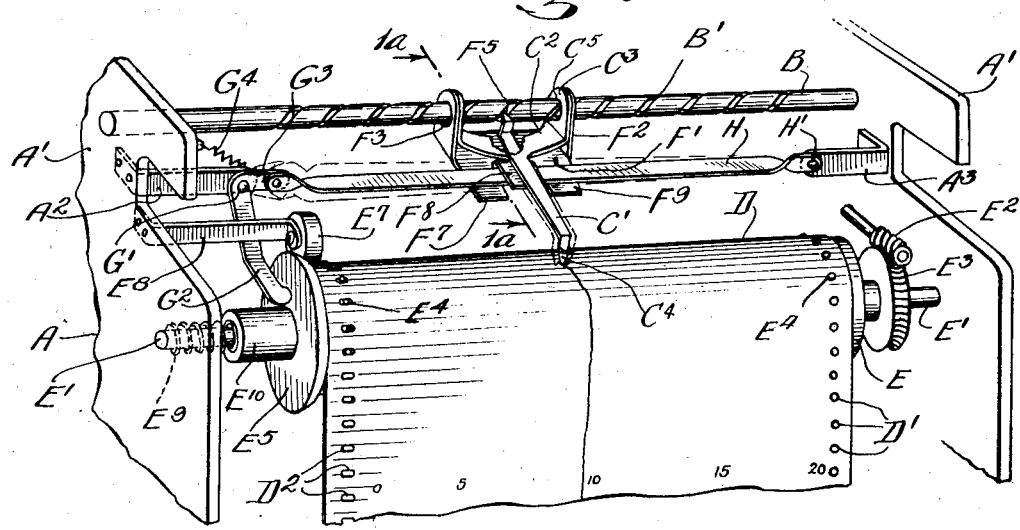
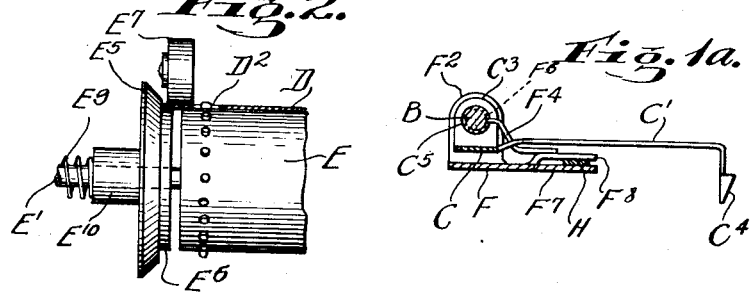
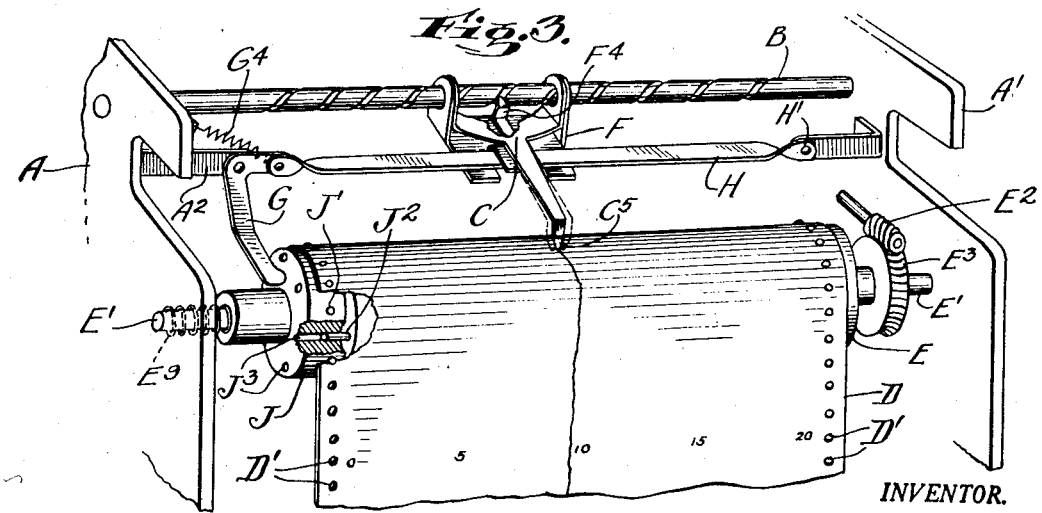
INVENTOR.
THOMAS R. HARRISON
BY John E. Hubbell
ATTORNEY Sept. 19, 1933.                T. R. HARRISON                1,927,402
                              MEASURING INSTRUMENT
                      Filed Jan. 24, 1930         2 Sheets-Sheet 2

INVENTOR.
THOMAS R. HARRISON
BY John E. Hubbell
ATTORNEY

Patented Sept. 19, 1933

1,927,402

UNITED STATES PATENT OFFICE 1,927,402

MEASURING INSTRUMENT

Thomas R. Harrison, Wyncote, Pa., assignor to The Brown Instrument Company, Philadelphia, Pa., a corporation of Pennsylvania Application January 24, 1930. Serial No. 423,028

7 Claims. (Cl. 234—1)

My present invention relates to measuring instruments and particularly to electric measuring instruments of precision which include a pointer or marking device moving over an exhibiting surface such as a graduated scale or chart, thus indicating or recording the magnitude of a quantity or condition being measured by the instrument. The operating mechanism of such instruments has been developed to a high degree of mechanical and electrical accuracy and efficiency for normal operating conditions. While the mechanism for measuring the quantity values and for transmitting such measurements to an exhibiting mechanism are highly accurate, the exhibiting surface on which the measurements are recorded or indicated varies in size due to changes in humidity of the atmosphere to which the surface is subjected. While such changes in record chart dimensions have been recognized, no practical mechanism has been developed for compensating the instrument for such changes so that the values indicated or recorded will accurately represent the actual measurements transmitted, regardless of the humidity conditions present.

In a recording instrument, for example, utilizing a traveling strip chart, the expansion or contraction in width of the chart with changes in humidity has ben recognized and permitted by mounting the chart on a driving roll with one side of the chart fixed relative to the roll, and the opposite side of the chart laterally movable relative to the roll. This arrangement is advantageous only in providing a smooth chart surface, but the quantity values recorded are inaccurate except under normal uniform humidity conditions. It is readily understood that in charts of a certain initial width, the error in the measurements recorded will vary with the respective scale ranges. In a 12" temperature strip chart having a range from 200° to 2000° F., for example, the error in the recorded measurements due to normal humidity changes may be as high as 25° F. While this percentage of error is relatively small, it represents the only substantial error now in precision instruments of this type.

The general object of my present invention is to provide mechanism for compensating a measuring instrument for changes in the dimensions of the instrument exhibiting surface due to changes in ambient conditions which affect the material of the exhibiting surface dimensionally such as changes in humidity and temperature of the atmosphere to which it is exposed.

A further and more specific object is to provide simple, effective and relatively inexpensive mechanism, either automatically or manually operated, for mechanically or electrically varying the position of the instrument indicating or marking element in accordance with changes in humidity affecting the graduated surface on which the measurements are indicated or recorded.

The various features of novelty which characterize my invention are pointed out with particularity in the claims annexed to and forming a part of this specification. For a better understanding of the invention, however, and the advantages possessed by it reference should be had to the accompanying drawings and descriptive matter in which I have illustrated and described preferred embodiments of my invention.

Of the drawings:

Fig. 1 is a perspective of a portion of a measuring instrument embodying my invention;

Fig. 1a is a vertical section on the line 1a—1a of Fig. 1;

Fig. 2 is an elevation partly in section of a portion of the apparatus of Fig. 1;

Fig. 3 illustrates a modification having a modified form of driving roll;

Figures 4, 5, 6:
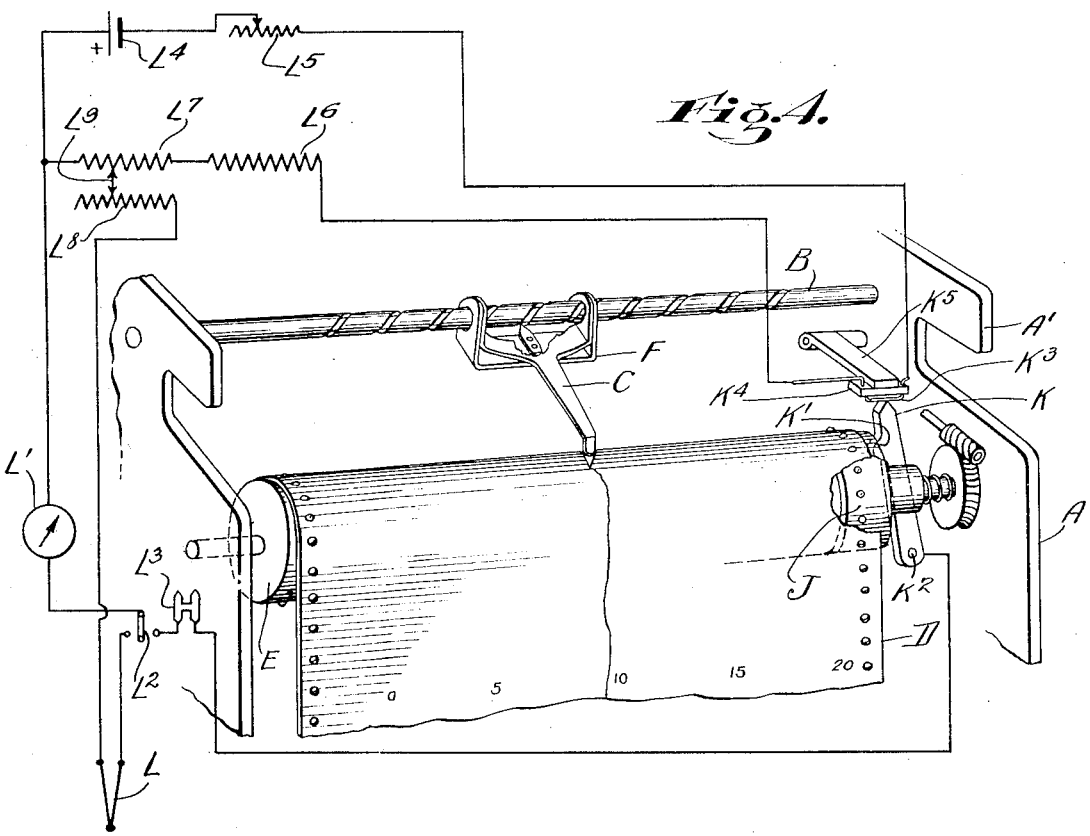
Fig. 4 illustrates a modification embodying electrical compensating means.
Figs. 5 and 6 illustrate manually adjustable humidity compensating arrangements.

In the drawings I have illustrated the use of my present invention in a recording potentiometer A for measuring and recording the magnitude of unknown electromotive forces in one or more circuits connected to the operating or galvanometer circuit of the instrument. The variations in energizing current values obtained are transmitted through suitable relay provisions to the exhibiting mechanism of the instrument which may comprise indicating or recording means or both. Such provisions may advantageously include a shaft B journalled in the instrument and plates A' and given rotative movements varying in magnitude and direction with the deflections of the galvanometer pointer. The exhibiting mechanism comprises a sheet metal marker supporting member C having an elongated horizontal arm C' extending forwardly from a yoke plate C², the side edges of which are turned upwardly to form a pair of ears C³. The arm C' at its outer end carries a recorder marking element C⁴ by which a record of the values of the quantity measured is made on a traveling record sheet or chart D, which usually is a paper web or strip.

The chart D travels over a cylindrical driving roll E mounted on and rotated by a horizontal shaft E' which is also journalled in the end plates A' of the instrument. The shaft E' is continuously rotated at a constant rate time controlled mechanism through a worm E² and worm gear E³. The chart is usually drawn from a supply roll (not shown) positioned below and at the rear of the roll E. The driving roll, as is customary in instruments of this character, is formed adjacent each end with a circumferential row of sprocket teeth or pins E⁴ which enter previously formed and suitably spaced openings D' and D² formed in the chart at the opposite edges of the latter. As shown, the openings D' are circular holes while the openings D² are laterally extending slots.

The marking element C⁴ is normally moved laterally of the strip by means of a non-rotating nut F surrounding the plate C² and consisting of a body plate F' having upstanding ears F² at its side edges and through openings F³ in the ears F² and openings C⁵ in the ears C⁴ the shaft B extends. The nut is operatively connected to the shaft by a spring finger F⁴ which is secured at one end to a raised portion of the plate F' and with its opposite end F⁵ tapering to a point and fitting into a spiral groove B' on the shaft B as shown in Fig. 1a. In addition to or in lieu of this operative engagement, the portions of either or both nut ears F² at the corresponding openings F³ may be formed with a fragmental screw thread F⁶ engaging the groove B'. The pitch of the groove B' is determined in accordance with the desired extent of movement of the marker, the nut is proportioned correspondingly.

As illustrated in Figs. 1 and 1a, the plate F' at its free end is divided into a plurality of horizontally extending tongue members F⁷, F⁸, F⁹, the outer portion of the intermediate tongue F⁸ being elevated relative to the tongues F⁷ and F⁹. The horizontal portion of the arm C' is carried on the tongue F⁸ as the member C moves laterally under the action of the nut F.

The instrument is initially assembled and calibrated with the pins E⁴ at one end of the roll E positioned at the middle of the corresponding slots D². As the atmospheric humidity increases, for example, the chart expands laterally, such expansion being permitted by the shape of the slots D² and the initial arrangement of the pins therein. The pins after such chart movement are now adjacent the inner ends of their respective slots. The proportionate movement of the chart portion beneath the marking element causes the latter to record a value slightly higher than the real value. I have found that this relative movement of the chart and marking element can be compensated for by shifting either the chart or marking element laterally a proportionate amount.

In the compensating mechanism illustrated in Figs. 1 and 2, the driving roll E cooperates with a tapered disc member E⁵ mounted on and slideable longitudinally of the shaft E' adjacent the zero portion of the chart. The disc E⁵ has a reduced cylindrical portion E⁶ projecting from one side and dimensioned to form a continuation of the surface of the roll E. The edge portion of the chart is held on the surface E⁶ with its adjacent edge contacting with the enlarged portion of the disc by a roller E⁷ mounted on a spring arm E⁸. The disc is continuously pressed against the side edge of the chart by a coiled spring E⁹ positioned between the end plate A' and the disc hub E¹⁰.

The lateral movements of the disc E⁵ in response to changes in position of the chart are transmitted to the marking element through a bell crank lever G pivoted at G' to a bracket A² projecting from the inner side of the plate A'. The lower arm G² of the lever contacts with the outer side of the disc and extends rearwardly and upwardly therefrom. The upper arm G³ of the lever extends laterally from the pivot G' into pivoted engagement with one end of a compensating bar member H, which extends horizontally from the opposite plate A' through the space between and contacting with the nut tongues F⁷, F⁸ and F⁹. The other end of the bar H has a stationary pivot connection H' with a bracket A³. Advantageously the pivot H' is in vertical alignment with the chart openings D'. The bar H will thus be lowered and raised by the lever G about the pivot H' as the ambient conditions such as humidity increases and decreases, respectively. The bell crank lever is maintained in contact with the outer side of the disc E⁵ by a spring G⁴ extending from the plate A' to the end of the lever arm G³.

With the foregoing parts constructed and arranged as described, it will be readily understood that as the bar H is lowered on an increase in humidity, for example, the nut F will be correspondingly moved on the shaft B. The special arrangement of the nut finger F⁴ and spiral groove B' effects a lateral movement of the nut towards the disc E⁵, if the shaft B is stationary at that time. If the latter is rotating, the lateral displacement of the finger and nut will be modified to an extent commensurate with the downward movement of the bar H. A corresponding movement of the marking element will simultaneously occur which will restore the marker to its proper position relative to the chart.

The chart being fixed relative to the roll E at one side by the holes D' and pins therein, the lateral movement of any other point on the chart relative to the roll on a change in humidity or other ambient conditions affecting the chart dimensionally will vary with the distance of the particular point from the fixed side of the chart. Therefore, when the marking element is near the substantially free side of the chart, a greater compensating movement is required than when it is adjacent the fixed side. This proportionate compensating movement is obviously attained in the compensating arrangement described by the position of the pivot H' and the arrangement and movement of the bar H.

The compensating arrangement illustrated in Fig. 3 differs from that of Figs. 1 and 2 in the arrangement and construction of the means directly responsive to the chart movements. In this construction, the compensating movement is obtained by the formation of the entire disc peripheral surface of the same diameter as and forming a continuation of the driving roll, by positioning one row of driving pins on the disc surface, and by connecting the disc and drive roll for simultaneous rotation. As illustrated, the driving roll E is fixed on and the disc J is slideable longitudinally of the shaft E'. A set of driving pins J' is arranged on the disc surface and arranged to engage in chart openings D' of a similar form and size. The roll and disc are connected for rotation by a plurality of angularly spaced pins J² projecting from one end of the roll E into corresponding longitudinal passages J³ in the disc. This connection permits movement of the disc longitudinally the shaft E' in response to changes in width of the chart while maintaining a driving connection between the roll and disc for giving the chart its constant movement under the marking element C⁴. The lateral movement of the disc J is transmitted to the marking element by mechanism similar to that shown in Fig. 1.

In Fig. 4 compensation for dimensional changes of the chart of a recording potentiometer resulting from variations in ambient conditions, such as humidity and temperature is effected by varying the potentiometer circuit of the instrument in accordance with the variations in width of the record strip chart. As conventionally shown in Fig. 4, the potentiometer circuit includes a thermocouple L, galvanometer L', switch L², standard cell L³, operating dry cell L⁴, rheostat L⁵, resistances L⁶ and L⁸, and slide wire resistance L⁷ and contact L⁹. The standard cell circuit is modified by the addition of a resistance K³ mounted on a supporting arm K⁵, which is connected to one of the end plates of the instruments and insulated therefrom by insulation material K⁴.

The "null" method of operation of a potentiometer circuit used herein is well understood in the art and comprises the periodic balancing of the standard cell to bring the galvanometer to zero, the adjustment of the rheostat L⁵ to standardize the energizing current, and the continuous or substantially continuous measurement of the e. m. f. of the thermocouple L by manually or automatically varying the position of the slide wire contact L⁹ until the galvanometer again reads zero. The intended purpose of the resistance L⁸ is to substantially neutralize the changes in the resistance in the circuit of the galvanometer L', and consequent changes in galvanometer sensitivity which the adjustment of the slide wire contact L⁹ tends to produce. The movement of the contact L⁹ is simultaneously transmitted mechanically or electrically to the marker operating shaft B. Suitable forms of potentiometer driving means for this purpose are well known to those skilled in the art.

The energizing current of the operating cell L⁴ is automatically varied for humidity and other ambient conditions affecting the record chart by means of a contact arm K pivotally supported at its lower end K² and having a laterally projecting finger K' engaging the outer end of the auxiliary driving roll J and following the longitudinal movements of the latter as does the arm G² in the construction illustrated in Fig. 3. The movements of the contact K across the resistance K³ proportionately decreases or increases the energizing current and thereby the extent of movement of the operating shaft B and working element as the width of the record chart D increases and decreases, respectively.

Variations in humidity conditions affecting the record chart may also be compensated for by a periodic manual adjustment of the marking element C⁴. The marking mechanism illustrated in Fig. 5 is similar to that shown in Fig. 1 except that the automatic compensating means are eliminated and compensation effected by a thumb screw R mounted in a plate bracket R' and connected at its lower end to the compensating bar H. The screw is periodically adjusted in accordance with the chart dimensions at the time of adjustment. Such adjustments may be made at the same time the operator performs other periodic adjustments of the instrument mechanism.

The apparatus illustrated in Fig. 5 can be simplified by arranging the adjustment provisions directly between the marker supporting member C and the operating nut F. As shown in Fig. 6, an adjusting screw S is mounted in the member C and arranged to contact with the upper surface of the nut. Rotation of the screw varies the angular position of the nut on the shaft B and consequently the lateral position of both nut and marker. This arrangement advantageously eliminates the use of the compensating bar H and adjusting provisions R and R'.

While in accordance with the provisions of the statutes, I have illustrated and described the best forms of embodiment of my invention now known to me, it will be apparent to those skilled in the art that changes may be made in the form of the apparatus disclosed without departing from the spirit of my invention as set forth in the appended claims and that in some cases certain features of my invention may be used to advantage without a corresponding use of other features. For example, the marking element illustrated in Figs. 1 and 3 could receive its compensating movement from a humidity-sensitive member other than the chart itself, such an independent member being made of the same material as the chart or of other material, such as hair or wood, having variations in a dimension due to humidity changes proportionate to the variations in position of the chart.

Having now described my invention, what I claim as new and desire to secure by Letters Patent is:—

1. In a measuring instrument having an exhibiting element responding to variations in magnitude of a quantity measured, an exhibiting surface, and compensating means for preserving the relative position of said exhibiting element and surface during changes in ambient conditions to which said surface is exposed tending to vary said relative position.

2. In a recording instrument, the combination with a marking element, of a record chart, and compensating means for preserving the position of said marking element relative to said chart operable in accordance with a change in a dimension of said chart due to a change in ambient conditions to which said chart is exposed.

3. In a recording instrument having a marking element responding to variations in magnitude of a quantity measured, a traveling record strip chart graduated for magnitudes of said quantity, and compensating means for preserving the position of said marking element relative to said chart operable in accordance with a change in width of said chart due to a change in ambient conditions to which said chart is exposed.

4. In a recording instrument having a marking element responding to variations in magnitude of a quantity measured, a traveling record strip chart graduated for magnitudes of said quantity, and compensating means for preserving the position of said marking element relative to said chart operable in accordance with a change in width of said chart due to a change in ambient conditions to which said chart is exposed and comprising a movable member in operative engagement with one side edge of said chart and mechanism operatively connected to and controlled by said slideable member for effecting a lateral movement of said marking element relative to said chart.

5. In a recording instrument having a marking element operatively engaging a spirally grooved drive shaft, rotated in accordance with the varying magnitudes of the quantity measured, a graduated record strip chart mounted on a continuously rotating driving roll with one edge portion fixed relative thereto, and compensating means for preserving the position of said marking element relative to said chart operable in accordance with a change in width of said chart due to a change in ambient conditions to which said chart is exposed and comprising a member operatively engaging and moving in accordance with the movements of a substantially free edge of said chart, and a compensating bar connected to said member and arranged to correspondingly vary the position of said marking element in said driving shaft groove.

6. In an electrical measuring instrument having an element moving in response to variations in value of an energizing current, an exhibiting surface graduated for magnitudes of a quantity bearing a definite relation to said element movements, and means for varying said energizing current in accordance with a change in a dimension of said surface due to a change in ambient conditions to which said surface is exposed.

7. In an electrical measuring instrument having an element moving in response to variations in value of an energizing current, an exhibiting surface graduated for magnitudes of a quantity bearing a definite relation to said current, and means for varying said energizing current in accordance with a change in a dimension of said surface due to a change in ambient conditions to which said surface is exposed comprising a resistance in the energizing current circuit and means responding to said change in said surface dimension for correspondingly varying said resistance.

THOMAS R. HARRISON.